United States Patent [19]

Döring

[11] Patent Number: 5,437,580
[45] Date of Patent: Aug. 1, 1995

[54] DOOR DRIVE MEANS WITH CORRUGATED TRANSMISSION BELT

[76] Inventor: Erich Döring, Im Hölzeli, CH 9442 Berneck, Switzerland

[21] Appl. No.: 158,239

[22] Filed: Nov. 29, 1993

[30] Foreign Application Priority Data

Nov. 27, 1992 [DE] Germany .......... 42 39 963.7

[51] Int. Cl.$^6$ .......... F16H 7/02
[52] U.S. Cl. .......... 474/153; 474/205; 49/280; 156/138
[58] Field of Search .......... 474/144, 153, 204, 205; 49/28, 197-200, 289, 280; 156/138; 160/189

[56] References Cited

U.S. PATENT DOCUMENTS

| | | | |
|---|---|---|---|
| 3,156,126 | 11/1964 | Olsen | 474/153 |
| 3,394,794 | 7/1968 | Styles | 474/204 X |
| 3,464,743 | 9/1969 | Hallaman | 474/204 X |
| 3,580,647 | 5/1971 | Richards | 474/153 X |
| 3,854,272 | 12/1974 | Lane | 474/153 X |
| 3,878,734 | 4/1975 | Zeldman et al. | 474/153 X |
| 4,072,062 | 2/1978 | Morling et al. | 474/153 X |
| 4,243,452 | 1/1981 | Richmond et al. | 156/138 |
| 4,520,684 | 6/1985 | Meyer et al. | 474/205 X |
| 4,885,872 | 12/1989 | Chang et al. | 49/200 X |
| 5,010,688 | 4/1991 | Dombrowski et al. | 160/189 X |

Primary Examiner—Roger J. Schoeppel
Attorney, Agent, or Firm—Kenyon & Kenyon

[57] ABSTRACT

A door drive including a belt transmission incorporating a corrugated transmission belt, consisting of a strip of plastic material and adapted to be passed around a corrugated or toothed drive wheel which entrains the transmission belt, having along its longitudinal extension transversely extending corrugations of approximately sinodial or tooth shaped configuration and is made of a plastic strip permanently deformed by embossing is described. The belt has a laterally projecting side strip at least at one side of the corrugated portion, especially approximately at midlevel between the wave crests and wave troughs, to accommodate longitudinal pull. In this manner a satisfactory compromise is achieved between low manufacturing cost, little noise, and the magnitude of the driving force which can be transmitted by a corrugated belt from locking the drive gear. Likewise presented are a belt transmission and a garage door equipped with a transmission belt of the proposed type.

4 Claims, 1 Drawing Sheet

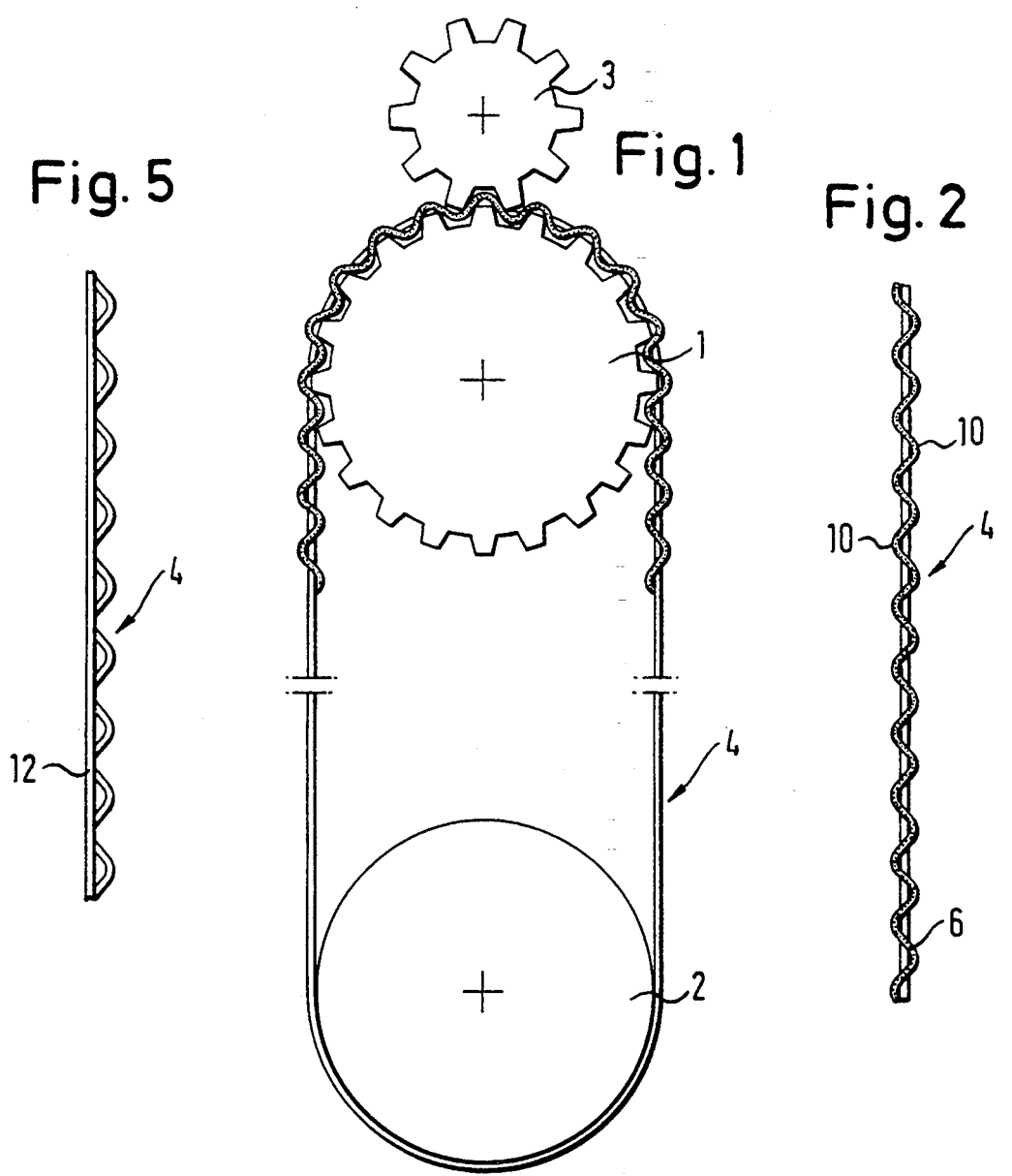
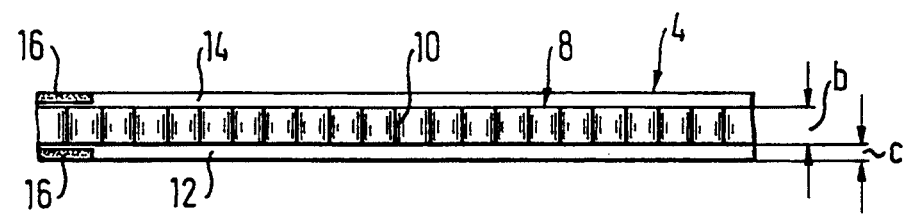
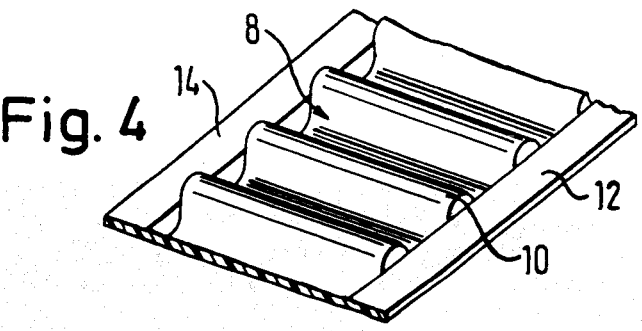

DOOR DRIVE MEANS WITH CORRUGATED TRANSMISSION BELT

FIELD OF THE INVENTION

The instant invention relates to a door drive means with corrugated transmission belt, a pliable transmission or drive belt for a belt transmission, embodied by a corrugated transmission belt made of a strip of plastic material and adapted to be passed around a corrugated or toothed drive wheel. The invention also relates to a belt transmission including such a drive belt, the door drive means which operating with such a belt transmission, especially on garage or workroom doors, and finally it relates also to an automobile garage door or workroom door furnished with such a door drive means, especially a door or gate of the wing- or panel-type, and a sectional or over-the-head gate.

BACKGROUND OF THE INVENTION

Transmission belts of the kind mentioned which transmit drive forces by form-lock engagement from a drive gear are just as well known as flat drive belts which are passed under tension around smooth drive and return pulleys, whereby the drive force is transmitted from the driven pulley to the belt by force or friction lock. It is known that the force to be transmitted can be increased by devising the transmission belt so that it has teeth which protrude from one side of a supporting belt and using a drive pulley provided with complementary teeth along its periphery. Likewise known are transmission belts which cooperate both in force- and friction-lock engagement with the drive wheel (belt pulley). Known flat belts are formed with spaced breakthroughs which are engaged by corresponding pins projecting from the periphery of the belt pulley. Another known transmission belt is corrugated or toothed and runs around spaced apart gears whose width corresponds to that of the transmission belt and of which one is a driven gear. This belt may have breakthroughs between individual wave-shaped deformations to permit drive forces to be introduced or branched off.

Other similar drive means are chain drives comprising suitable sprocket gears, others comprising steel cables which are passed around grooved pulleys, or rope transmissions with balls or the like fastened on the ropes at certain spacings for engagement in complementary, widened sections of grooves formed in the drive pulleys. All these measures are intended to warrant that the drive force is transmitted in form lock. The fields of application of these drive means partly differ from one another, while they overlap in other respects. The strengths and weaknesses, or the advantages and disadvantages, of all these drives are well known. Those skilled in the art likewise dispose of sufficient knowledge concerning materials which are suitable for flat belts and V belts.

SUMMARY OF THE INVENTION

It is the object of the invention to provide a door drive means, a belt transmission, a drive belt, and a door, all of the type mentioned above, which permit good transmission of the drive force in form lock and at a low noise level. At the same time, the structure is to be simple and, therefore, inexpensive.

A sound compromise is to be offered between less sophisticated design and performance, low manufacturing cost, on the one hand, and reliability in operation, on the other hand, while not attempting to accomplish transmission of extremely high drive performance.

A door drive means with a corrugated transmission belt of the type specified initially which solves that problem is characterized in the claims, various modifications also being indicated.

The transmission belt of the door drive means is characterized in that the belt itself is made of a plastic strip permanently deformed by embossing, and the belt comprises a laterally projecting side strip at least at one side of the corrugated portion, especially approximately at midlevel between the wave crests and wave troughs, to accommodate longitudinal pull.

This design presents a very simple transmission belt obtained by cold or hot stamping or embossing a flat strip of plastic material. In the middle, in longitudinal direction, this belt has a corrugated portion which is wavy or tooth shaped and serves to enter into form-lock engagement with a driving or a driven member. Along the sides, the belt includes projecting side strips to take up the longitudinal loads. By virtue of this design, there is no risk that the transmission belt, even if made of a relatively thin strip of material, will stretch in the course of operation, whereby its engagement with the drive gear or the driven gear would deteriorate. The straight marginal zones which are not elongated guarantee that the central portion which has been stretched by the embossing procedure will remain stable. Manufacturing becomes very convenient if the side strips are located approximately at midlevel between the wave crests and wave troughs because then the embossing can be accomplished by counter-rotating embossing gears which deform the material of the flat strip approximately to the same extent in both directions out of the original plane. Moreover, this midlevel location has the advantage of providing uniform support in both directions so that the drive member can be used from both sides. Furthermore, this design allows great changes in direction via return or deviator pulleys so that a favorable position of the drive means comprising the gears can be achieved most easily, permitting the force to be introduced at or near the pitch circle of the gear.

Another convenient embodiment of the transmission belt has the side strips located at the level of the wave crests or troughs, and the wave crests or troughs themselves are flattened in the plane of the side strips. Such a transmission belt is characterized by extremely good stability in shape in the plane of the side strips and can accommodate relatively great pull, even if it is only very thin.

The side strips of the transmission belt conveniently have a width of up to 50% of the width of the corrugations. This applies accordingly to the width of cylindrical edge portions of the gears, if provided. However, the width also may be less.

The costs of the novel transmission belt are relatively low when compared to chains, V belts, toothed belts, and the like, amounting in part to no more than about 15% of the former.

Suitable materials for the belt are plastics of high bearing strength of which a variety of forms are known. Polyamides and polypropylene proved to be suitable. The plastic material may be reinforced. In that event, a specific embodiment comprises side strips of the transmission belt which are provided with a friction coat of rubber or an adhesive fabric.

This in particular makes it possible to devise a belt transmission utilizing a transmission belt according to the invention, wherein the drive gear and perhaps also the driven gear include a cylindrical edge portion, laterally of the toothing, which is engaged by the side strip of the belt and the diameter of which corresponds to the diameter of the pitch circle of the teeth. In this manner the drive force can be transmitted in friction lock in addition to the transmission in form lock, and yet the side strips do not become worn quickly due to slip with respect to the gear.

In the case of a belt transmission comprising a drive belt according to the invention, an embodiment proved to be successful which comprises at least one more toothed wheel adapted to mesh loosely with the driven toothed wheel. This additional wheel serves to hold the belt in the gaps between the teeth of the first wheel.

It may prove to be convenient for all the gears to have different diameters because, on the one hand, that improves the engagement and, on the other hand, it permits switchover from the drive of one gear to that of the other. In other words, this presents a changeover gear mechanism which allows the running speed of the belt to be changed from one to another. In operation, it proved that the drive is effected practically without slip, even when shock loading occurs. Three travelling speeds of the transmission belt can be obtained if three intermeshing gears of different diameters are provided around which the drive belt passes.

The transmission belt according to the invention can be used especially advantageously with door or gate drive means, above all with drives for wing- or panel-type doors, or sectional or over-the-head gates, in particular for automobile garages or workrooms. In this case the drive force for opening and closing of the door leaf is derived from the return pulley or from the transmission belt via specific means. This kind of door drive likewise is provided by the invention.

Finally, the invention also provides an automobile garage door and a workroom door comprising a door drive means according to the invention.

BRIEF DESCRIPTION OF THE DRAWING

An embodiment of the invention will be described in greater detail below, with reference to a drawing, in which:

FIG. 1 is a longitudinal sectional elevation of a belt transmission of a door drive;

FIG. 2 shows a longitudinal center section through a transmission belt

FIG. 3 is a top plan view of a transmission belt;

FIG. 4 shows part of a transmission belt in an oblique perspective view;

FIG. 5 presents a modification of the transmission belt in side elevation.

DESCRIPTION OF THE PREFERRED EMBODIMENT

The belt transmission illustrated in FIG. 1 comprises a driving gear 1, a driven gear 2 disposed at the particular distance required, another gear 3 which loosely meshes with the first gear 1 and preferably is wider than the second gear 2, as well as a transmission belt 4 which is corrugated or toothed in longitudinal direction. The spacing between gears 1 and 2 may be as great as required in any particular case. The corrugated transmission belt 4 consists of polyamide, being embodied by an originally flat plastic strip of a thickness of e.g. 1 mm which was subjected to hot embossing. Deformations 6 of wave or tooth shape protrude by more or less the same amount in either direction from the plane of the originally flat strip, see FIGS. 2 and 4. Side strips 12 and 14 are formed at both transverse sides of the central corrugated zone 8 of the transmission belt 4 and at midlevel between the crests 10 and troughs 10 of the waves, i.e. in the plane of the originally flat strip. The width c of the side strips is less than half the width of the corrugation 8, see FIG. 3. In the modification illustrated in FIG. 5, the side strips 12, 14 are located in the plane of the flattened wave troughs, while the wave crests are rounded.

In FIG. 3 a friction coat 16 is indicated on the top of the side strips 12 and 14.

An engagement piece or pickup means (not shown) may be provided on the transmission belt if a garage door is to be moved in two directions. If the actuating path is shorter than the distance between the two gears 1 and 2, this pickup means reciprocates between the gears.

What is claimed is:

1. A door drive means for wing-, panel-, sectional- or over-the-head type doors, which doors have a movable door leaf, in particular for automobile garages or workrooms, comprising a motor driven drive gear and a corrugated transmission belt made of plastics having along its longitudinal extension transversely extending corrugations of approximately sinusoidal or tooth shaped configuration having wave crests and wave troughs, which belt passes around a return gear, and further comprising means by which the drive force for opening and closing of the door leaf is derived from the return gear or from the belt and transmitted to the door leaf, wherein the belt is made of a plastic strip permanently deformed by embossing, and the belt comprises a laterally projecting side strip at least at one side of the corrugated portion, approximately at midlevel between the wave crests and wave troughs to accommodate longitudinal pull.

2. The door drive means as claimed in claim 1, wherein the drive gear includes teeth defining a pitch circle having a diameter, the drive gear also including a cylindrical edge portion having a diameter, laterally of its toothing, the diameter of this cylindrical edge portion corresponding to the diameter of the pitch circle of the teeth and the edge portion being engaged by the side strip of the belt.

3. The door drive means as claimed in claim 1, wherein each side strip of the belt is provided with a friction coat of rubber or an adhesive fabric.

4. A door drive means for wing-, panel-, sectional- or over-the-head type doors, which doors have a movable door leaf, in particular for automobile garages or workrooms, comprising a motor driven drive gear and a corrugated transmission belt made of plastics having along its longitudinal extension transversely extending corrugations of approximately sinusoidal or tooth shaped configuration having wave crests and wave troughs, which belt passes around a return gear, and further comprising means by which the drive force for opening and closing of the door leaf is derived from the return gear or from the belt and transmitted to the door leaf, wherein the belt is made of a plastic strip permanently deformed by embossing, and the belt comprises a laterally projecting side strip at least at one side of the corrugated portion to accommodate longitudinal pull, wherein the side strip is located at the level of the wave crests or wave troughs, and the crests or troughs themselves are flattened in a plane of the side strip.

* * * * *